US008489706B2

(12) United States Patent
Schilders

(10) Patent No.: US 8,489,706 B2
(45) Date of Patent: Jul. 16, 2013

(54) SAFE OUTPUT PROTOCOL FOR FILES TO MULTIPLE DESTINATIONS WITH INTEGRITY CHECK

(75) Inventor: Koen Schilders, Riel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 16 days.

(21) Appl. No.: 13/345,350

(22) Filed: Jan. 6, 2012

(65) Prior Publication Data
US 2012/0166587 A1 Jun. 28, 2012

Related U.S. Application Data

(63) Continuation of application No. 10/481,542, filed on Jul. 2, 2004, now Pat. No. 8,117,274.

(51) Int. Cl.
G06F 15/16 (2006.01)
(52) U.S. Cl.
USPC .......................................................... 709/217
(58) Field of Classification Search
USPC .......................................................... 709/217
See application file for complete search history.

(56) References Cited

U.S. PATENT DOCUMENTS

| 6,330,586 | B1 * | 12/2001 | Yates et al. ..................... 709/201 |
| 6,657,989 | B1 * | 12/2003 | Hilsenrath ..................... 370/351 |
| 6,683,870 | B1 * | 1/2004 | Archer ........................... 370/356 |
| 6,735,592 | B1 * | 5/2004 | Neumann et al. ..................... 1/1 |
| 6,947,946 | B2 * | 9/2005 | Nishikawa ............................. 1/1 |
| 6,980,512 | B2 * | 12/2005 | Uskela et al. .................. 370/230 |
| 7,050,427 | B2 * | 5/2006 | Archer ........................... 370/356 |
| 7,123,608 | B1 * | 10/2006 | Scott et al. .................... 370/353 |
| 7,130,901 | B2 * | 10/2006 | Roach ........................... 709/224 |
| RE39,717 | E * | 7/2007 | Yates et al. ..................... 709/201 |
| 7,340,436 | B1 * | 3/2008 | Lilge ............................... 705/53 |
| 7,457,279 | B1 * | 11/2008 | Scott et al. .................... 370/352 |
| 7,869,425 | B2 * | 1/2011 | Elliott et al. .................. 370/352 |
| 8,094,647 | B2 * | 1/2012 | Elliott et al. .................. 370/352 |
| 8,270,951 | B2 * | 9/2012 | Gidron et al. ............... 455/414.1 |
| 2002/0087682 | A1 * | 7/2002 | Roach ........................... 709/224 |
| 2002/0188736 | A1 * | 12/2002 | Jarvensivu ..................... 709/229 |
| 2004/0125931 | A1 * | 7/2004 | Archer ....................... 379/201.01 |
| 2006/0168303 | A1 * | 7/2006 | Oyama et al. ................. 709/231 |

* cited by examiner

Primary Examiner — Brian P Whipple

(57) ABSTRACT

Protocol is provided for safe transfer of files from between nodes of a communication system. The protocol includes a handshake operation between a source (local or initiating) node sending one or more files and a remote (responding) node receiving the files to ensure that control of the file remains with the source node a configurable amount of time until the file is successfully transferred. A file transfer manager controls the transfer process through a series of file moves that include moving the file into a directory associated with the file transfer manager, from which the file is sent and moving the file out of that directory after the remote node acknowledges a safe copy operation of the file. Files can be retrieved by the remote node after they have been transmitted, after which they will be deleted from the local node.

2 Claims, 6 Drawing Sheets

SAFE OUTPUT PROTOCOL FOR FILES TO MULTIPLE DESTINATIONS WITH INTEGRITY CHECK

RELATED APPLICATIONS

This application is a continuation of co-pending U.S. patent application Ser. No. 10/481,542, filed on Dec. 19, 2003, which is claims benefit of from U.S. Provisional Application No. 60/299,475, filed on Jun. 21, 2001, the disclosures of which are fully incorporated herein by reference.

BACKGROUND OF THE INVENTION

The present invention relates to a protocol for reliable transfer of information in a communications network, and in particular, to a reliable output protocol for sending files from one node to one or more other nodes in a network.

DESCRIPTION OF THE RELATED ART

The brisk pace of development in fixed and wireless telecommunications networks has led to an ever-increasing scope of service and business-support functions supported by these networks. These functions usually require an exchange of information that is tied with value, such as a generated revenue value or any other value deemed critical to a business, government or personal entity. Examples of valuable information exchanged between computer systems include, for example, charging data transferred from a telephone switch to a billing system, fund transfers, tax filings, credit reporting, financial reporting between offices and statistics from the telephony or radio parts of a network that must be collected to optimize network efficiency.

Many new and innovative subscriber services require complex charging schemes. In one new service, "virtual" operators are willing to pay for the right to use telecom equipment owned by other operators. Network operators of these services are demanding fast, almost instant billing (such as with prepaid cards), in which charging data must be processed and made accessible in real-time or near real-time. Real time or near-real time processing of files is also desired in network systems providing detection of fraud, hot billing, subscriber analysis or subscriber crediting services.

At the same time, the implementation of more and more applications on large numbers of small machines has led to an increase in movement of data between business computer systems. Much of this data exchange is performed using file transfer software embedded within business software applications running on these computers. Software designers are often required to include specific interfaces to the file-transfer software in their programs. In addition, these programs frequently deal with matters such as error-analysis, recovery, routing, and receipting, which are more appropriate to communications software than to business applications.

Network operators are finding themselves increasingly burdened as the volume of information switched over their network nodes continues to grow. To cope with rapidly increasing data-processing loads relating to call-charging, and the demand for real-time or near real time accessibility of this data, network operators are increasingly offloading capacity-demanding tasks to external computing systems for subsequent processing. These external systems are generally open standard (e.g., transfer control protocol/Internet protocol (TCP/IP) and open systems interconnect wide area network (OSI-WAN)).

It is imperative that the data not be corrupted, lost or duplicated when valuable information is sent from a source to a destination in a telecommunications network. In the case of charging data from a telephony switch to a billing system, for example, data-loss would imply loss of revenue because subscribers cannot be billed for their telephony usage. On the other hand, data-duplication would imply over-billing of subscribers, which could result in subscribers leaving the operator, bad publicity, and thus loss in revenue. It is therefore vital that the charging information be transported in a reliable, safe way and that control over the information is either at the sending or receiving end (e.g., at a telephony switch or at a billing system). A system transferring valuable data should also have the ability to cope with situations involving problems with the communications link (e.g., when the link is broken) or with any of the two nodes involved (e.g., system crash/restart).

Several things may go wrong as soon as an information file is at and under control of a receiving end device (e.g., a billing system computer) even when one or more files are transferred intact from a local node to a remote node. For example, data can be corrupted during storage of the file on disk or during the process of copying it, which will ultimately result in revenue loss for the operator.

Thus, there remains a need in the art for a file output protocol that safely and reliably transfers files from one network node to one or more other network nodes without loss or duplication of the files and also insures that files that have been transferred remain accessible for retransmission.

SUMMARY

Accordingly, the present invention is directed to safe output protocol for files to multiple destinations with integrity check that substantially obviates one or more of the problems due to the limitations and disadvantages of the related art.

In one aspect of the present invention, an output protocol in a communication system includes a handshake between a local node and a remote note to specify when a file is under the control of the local node and when it is under the control of the remote node.

Additional aspects and advantages of the invention will be set forth in the description that follows, and in part will be apparent from the description, or may be learned from practice of the invention. The aspects and advantages of the invention will be realized and attained by the system and method particularly pointed out in the written description and claims hereof as well as the appended drawings.

It is to be understood that both the foregoing general description and the following detailed description are exemplary and exemplary only and are not restrictive of the invention, as claimed.

It should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION OF EXEMPLARY EMBODIMENTS

Figure 1:
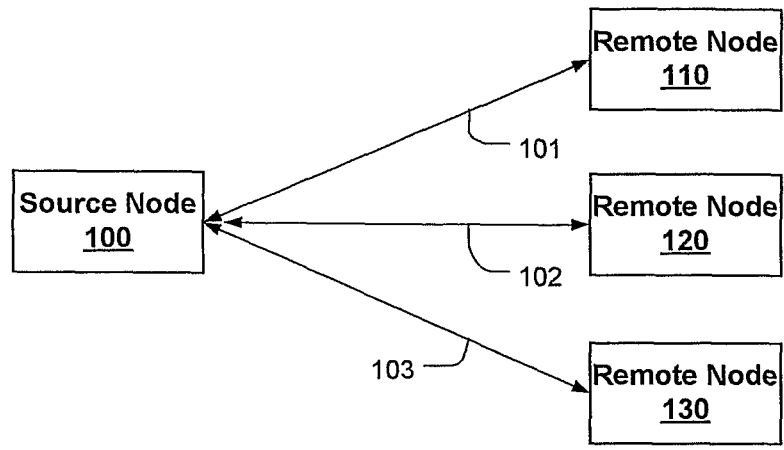
FIG. 1 is a block diagram of a computer at a source node and three remote node computers in a communications network.

FIG. 1 shows a communications network that includes a computer at a source node 100 from which files are transferred along any one of communication paths 101-103 to a corresponding computer at network destination nodes 110-130. While three destination nodes are shown, it is to be understood that the number of destination nodes may be any number, including one. Communication paths 101-103 are shown in simplified form as direct communication paths between node 100 and nodes 110-130, however, each of the communication paths 101-103 may include a combination of fixed and/or wireless communication links established between numerous intervening nodes from source node 100 and destination nodes 110-130. It is to be understood that the designation "source" ("local") or "destination" ("remote") depends on the reference point where an outgoing file transfer originates. For example, any one of computers at nodes 110-130 also may be sending one or more files to the computer at node 110. In this case, location of one of the nodes 110-130 sending one or more files is considered to be at the source (local) node and the location of the node 110 is considered to be at the destination (remote) node.

Figure 2:
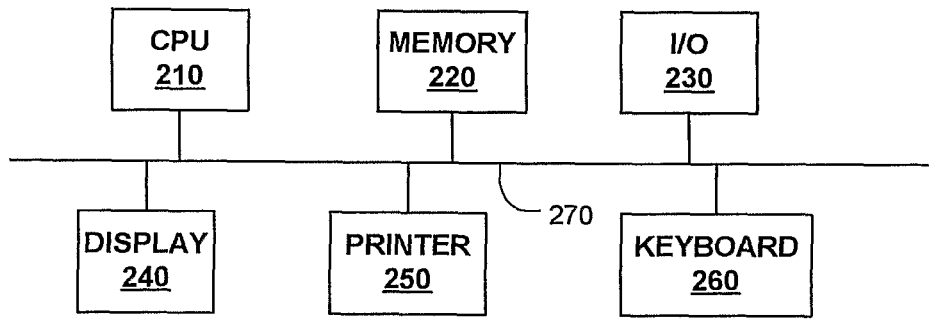
FIG. 2 shows the hardware components of the computers shown on FIG. 1.

FIG. 2 shows the main hardware components of each of the computers at nodes 100-130. These hardware components include a central processing unit (CPU) 210, a memory 220, and an input/output (I/O) port 230. Also shown are peripheral components that may be included in each computer 100-130. These peripheral devices include a display device 240, a printer 250, and a keyboard 260. Each of components 210-260 is shown connected together by a bus 270. The I/O port 230 is used to connect the computer to a communication link, such as one of communication paths 101-103. The computer memory 220 includes software comprising one or more active or inactive application programs that run on the computer. These application programs can be related, working together, or they can be performing their own independent activities. As explained below in detail, at least the computer at source node 100 includes output protocol that utilizes the normal file system of the computer at source node 100 to process files for transfer to one or more of the other computers at destination nodes 110-130.

Figure 3:
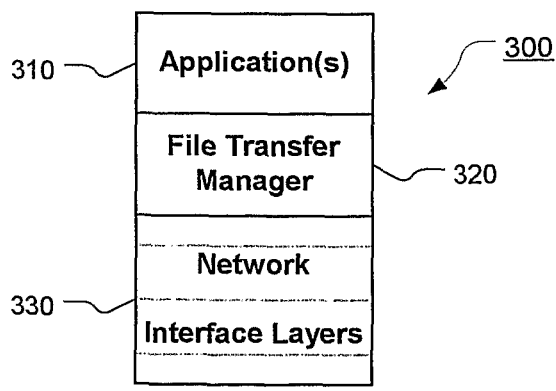
FIG. 3 shows an exemplary protocol stack in accordance the present invention.

With reference to FIG. 3, there is shown layered communication architecture (a protocol stack) 300 of the computer at the source node 100. Protocol stack 300 comprises application layer 310 that includes one or more software applications for performing tasks pertinent to the particular mission of a business unit, organization, person or other entity utilizing the computer. At least one of these applications has access to files that are stored in the computer memory 220 and may function to move and/or copy the files within the directories of the memory 220, as well as initiate sending one or more of the files in the memory to a computer at a remote node. Associated with the application layer is a file transfer manager 320. File transfer manager 320 uses output protocol in accordance with the present invention, described later in detail, that controls the transfer of one or more files and messages between source and remote nodes. The output protocol used by file transfer manager 320 may be performed by software resident to at least one or more applications running on the computer at the source node or provided in a separate software program accessible by any one of these applications. When an application running on the computer initiates a transfer of one or more files, the file transfer manager 320 is responsible for controlling the transfer based on output protocol that controls a sequence of events.

Network interface layers 330 allow communication between various systems and/or applications running on a computer network. The output protocol used by file transfer manager 320 is an intermediate layer in the protocol stack 300 that communicates with both the application layer and the interface layers 330. Interface layers 330 include the high level file transfer protocols necessary to specify the contents of the file and its properties and lower level protocols at which the data is transmitted in individual bytes of data between the source node computer and the destination computers. For example, communication architecture 300 may be based on an Open Systems Interconnection (OSI) reference model that includes the file transfer, access, and management (FTAM) protocol, or the file transfer protocol (FTP) of the Internet standard. Data transmitted at the lower level protocols may use either local area network (LAN) or wide area network (WAN) protocols. For example, transfer control protocol/ Internet protocol (TCP/IP) and Ethernet-enable LAN-type communication may be used in local and large networks, and X.25 (OSI-WAN standard) protocols may be used in a WAN. X.25 is the ITU-T recommendation for the interface between data terminal equipment (DTE) and data circuit-terminating equipment (DCE) for terminals operating in the packet mode and connected to public data networks by dedicated circuit. Of course, other industry-standard data transmission protocols may be used in the present invention, for example, Token Ring, ATM, SONET, and Frame Relay.

Figure 4:
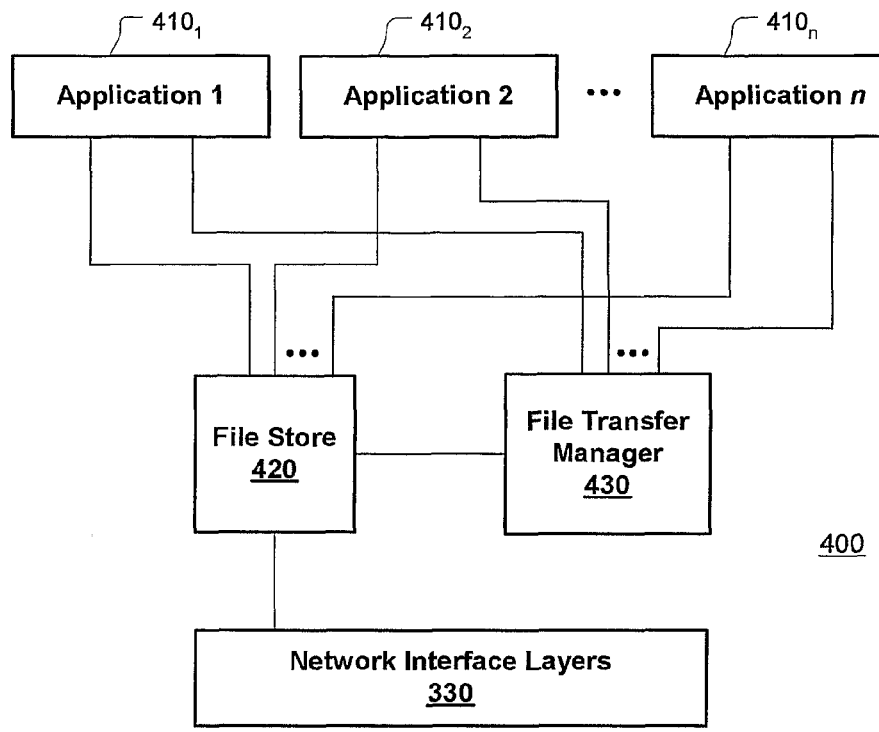
FIG. 4 is a block diagram showing an exemplary relationship between a file transfer manager using output protocol in accordance with a first embodiment of the present invention and computer components at a source node.

FIG. 4 shows a generalized diagram of a system 400 including a communication protocol based on protocol 300 of FIG. 3 utilizing output protocol in accordance with a first exemplary embodiment of the present invention. The present embodiment uses a file system resident to, associated with, or used by one or more applications running on a computer to facilitate safe transfer of one or more files stored on that computer to at least one other computer in a communications network. System 400 is included in at least a computer at a source node, however, both the source node computer and a remote (destination) node computer may comprise system 400. As shown in FIG. 4, system 400 includes any number, n, of active or inactive applications 4101-410n that can be related, working together, or working independently from one another. At least one of the applications 4101-410n has access to a file store 420 where files of the computer file system are stored. System 400 also includes a file transfer manager 430 that uses an output protocol, described later in detail, to provide safe and reliable transfer of one or more files between the source node and the remote node(s). The file transfer manager 430 has access to and control over a number of directories in the file store 420. These directories also may be accessible by at least one of the applications 4101-410n.

When one of the applications 4101-410n on the source computer wishes to send one or more files to a remote (destination) node computer, the file(s) intended for transfer are moved or copied to a directory in the file store 420 associated with the file transfer manager 430. For example, an application wishing to send a file to a remote node computer may move one or more files to an "initial" directory associated with the file transfer manager 430, which periodically scans the initial directory to detect the presence of files waiting to be transferred. Alternatively, a file transfer program 430 may be running in the background of an operating environment of a source node computer and may work in conjunction with at least one application program on the source node computer when the application wants to send one or more files to a remote node. The system 400 also may process an outgoing transfer of files from the source node computer by way of a request from a remote node computer. The file transfer manager also may include or has access to a calendar function (not shown) that initiates a file transfer from the file store 420 at predetermined intervals of time.

Thus, an outgoing transfer of one or more files from a computer at a source node may be accomplished by an explicit call to the file transfer manager 430 to initiate a file transfer by an application running on the source node computer or a request by a remote node computer to fetch a file (or files) from the source node computer, or by the file transfer manager itself detecting a file during a periodic scan of its initial directory (to which an application wanting to transfer a file forwards the file). In any case, if one or more files intended for outgoing transfer are forwarded to the initial directory associated with the file transfer manager 430, a series of processes including moving the file between directories at the source node is performed before and after the file communicates with protocol layers of the network interface layers 330. The series of processes additionally include exchanging control over the transferred file to the remote node computer by renaming the transferred file at the remote node after the file has been moved from the directory from which files are sent by the source node computer.

Based on the foregoing, the operating system of at least the source node computer should support directories, and file rename or move operations should be atomic. The system 400 is independent of the operating system of the remote node computer, which may be a Windows Nt™, Windows 2000™, Windows 98™, Windows 95™, Novell NOS, Tandem™, Novell™, OS/390™, AS/400™, Open VMS, MVS, or UNIX™ operating system, for example. The system 400 of the present invention obtains a benefit of using industry-standard platforms in that the system 400 may connect with anything from a PC to a mainframe computer.

Figure 5A:
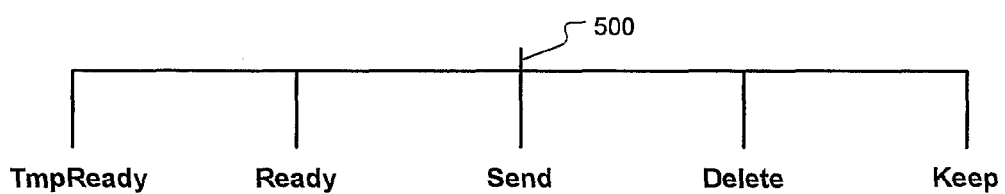
FIG. 5a shows an exemplary directory structure associated with output protocol of the first embodiment of the invention.

Exemplary processes performed by the output protocol will now be described with reference to FIGS. 5a-5g. As shown in FIG. 5a, the output protocol may utilize a directory structure 500 that includes the following directories:

TmpReady. This directory contains files that are being created, but not yet ready for transmission. Directory TmpReady may comprise the "initial" directory associated with the file transfer manager 430, described above.

Ready. This directory contains the files that are ready to be sent.

Send.<ID>. This is a series of directories, one for each remote node, that contains the files that are currently being sent to those remote nodes.

Delete. This directory contains files that have been recently successfully sent to a remote node.

Keep. This directory contains all the files that have been successfully sent. They remain here until a predefined time period has elapsed or the disk of the local node runs out of disk space.

The names of the files to be transported are flexible. For example, in the case systems transferring charging data the names of the files may be constructed of the dynamically variable terms listed in the Table.

Figure 5B:
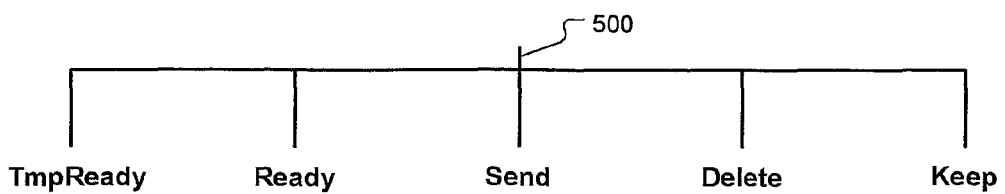
FIGS. 5b-5g are illustrative of exemplary file movement processes within the directory shown in FIG. 5a that are provided by output protocol of the first embodiment.
Figure 5C:
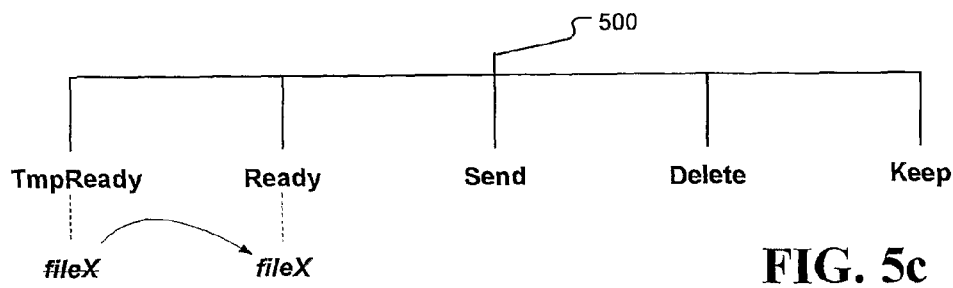
Figure 5D:
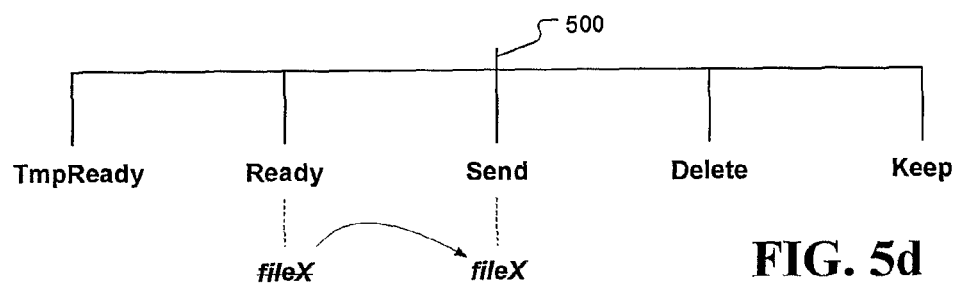
Figure 5E:
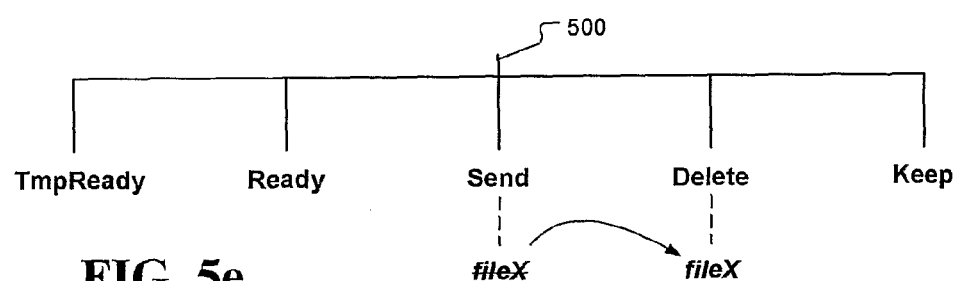
Figure 5F:
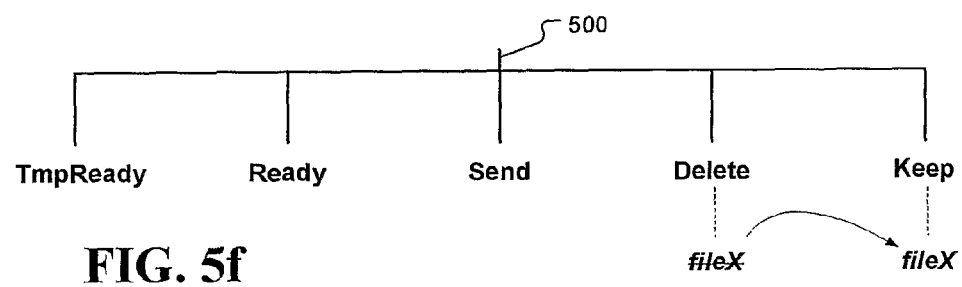

TABLE 4 digit year
2 digit year
2 digit month
2 digit day
2 digit hours
2 digit minutes
2 digit seconds
4 digit transient (reset to zero at system restart) sequence number without leading zeros
4 digit transient (reset to zero at system restart) sequence number with leading zeros
4 digit persistent (never reset to zero) sequence number without leading zeros
4 digit persistent (never reset to zero) sequence number with leading zeros
A constant string
Cyclic Redundancy Check (CRC), used for integrity check on the file
Exchange (or node) name With reference to FIG. 5b, when an application on the computer at a source node wishes to send file(s) to a computer at a remote (destination) node the source node computer creates and saves the file(s) in the TmpReady directory. In FIG. 5c, the file created and saved in the TmpReady directory is moved to the Ready directory once the file is ready for transmission. As shown in FIG. 5d, once the local node wants to send a file or the remote node wants to fetch a file, one or more files are moved from the Ready to the Send.<ID> directory. While FIGS. 5a-5g show a single directory "Send" for the Send.<ID> directories, the Send directory may actually comprise series of directories, for example, Remote1, Remote2, etc., for storing one or more files for transfer to respective ones of a plurality of remote nodes. In FIG. 5e, files in the Send.<ID> directories are sent, one by one, to the remote node where they are stored with the same name in a receiving directory of the remote computer, but with a ".tmp" extension. As long as this remote file has this ".tmp" extension, control over this file is still at the local node such that the remote node is not allowed to handle the file. When the sending of one file from the Send.<ID> directory is complete, the file is moved from the Send.<ID> directory to the Delete directory, as shown in FIG. 5f. After the file is moved to the Delete directory, the computer at the source node sends a message to the computer at the destination node which instructs the computer at the destination node to remove the ".tmp" extension of the transmitted file or rename the file without the ".tmp" extension. As soon as the ".tmp" extension is removed, the system at the remote node assumes control over the transmitted file.

Figure 5G:
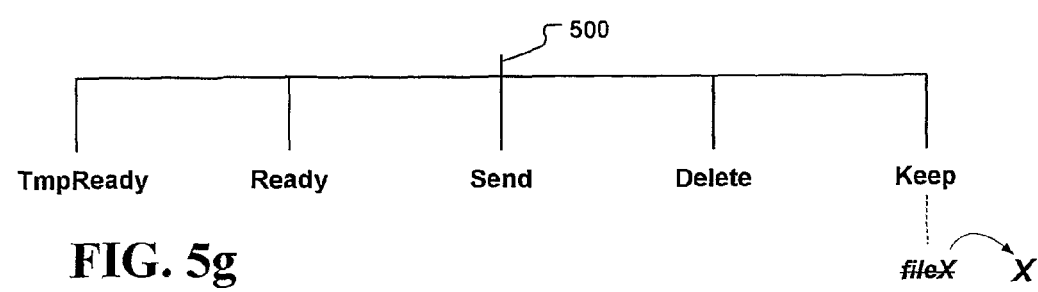

If more files are remaining in the Send.<ID> directory, then processes shown in FIGS. 5e to 5g are repeated. If there are more files in the Ready directory to send, then the processes shown in FIGS. 5d to 5g are repeated with an additional repetition of the processes of FIGS. 5e to 5g for each file moved to the Send.<ID> directory from the Ready directory. The Delete directory is on regular intervals scanned for new files that have occurred here. If files are found, they are moved to the Keep directory. This is done to prevent overhead from becoming increasingly large when scanning a directory which may contain thousands of files. If files are in the Keep directory for the specified time or when a disk allocation threshold is met or exceeded, they are removed.

The output protocol of the present embodiment is efficient in that it requires minimal system resources for its support. This is because a file system used by the output protocol is already resident to and used by a system and a minimal amount of software is required to implement the protocol. The output protocol also is independent of the underlying file transfer protocol (e.g., FTP or FTAM) or network architecture (e.g., TCP/IP and OSI-WAN).

Figure 6:
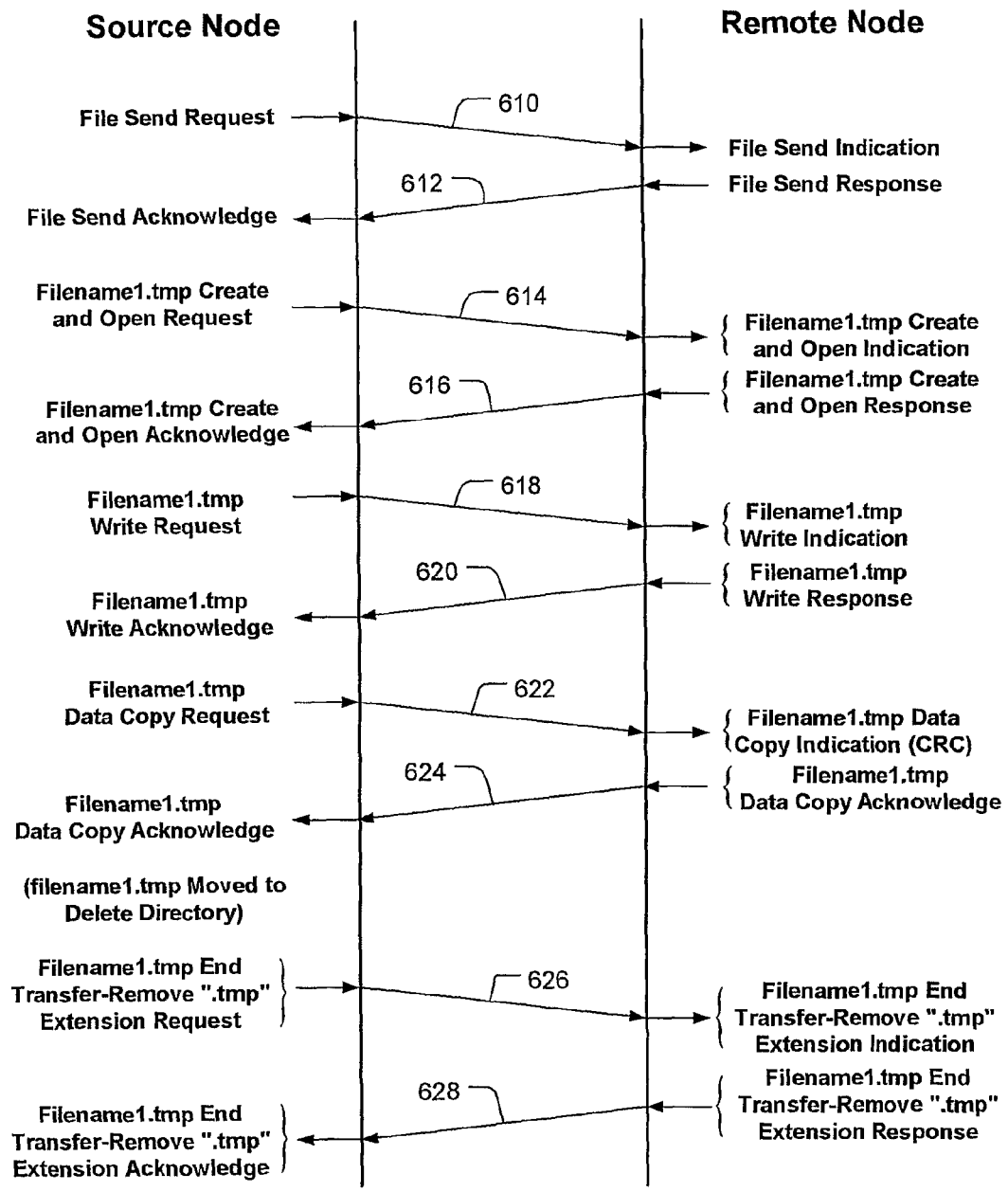
FIG. 6 is a graph illustrating an exemplary file transfer process provided by output protocol of the first embodiment of the present invention.

FIG. 6 is a graph showing an exemplary sequence of events used in the protocol of the present embodiment when transferring a file from a source node computer to a remote node computer. For example, the sequence of events of FIG. 6 may occur during processes shown in FIGS. 5d and 5e. As shown in FIG. 6, after the one or more files in the Ready directory are moved to the Send.<ID> directory, the source node computer sends a request message 610 to the remote node computer requesting a file transfer. At the same time, a timer may be started. The request message includes an identifier for the transfer and details of the files that it wishes to send. The identifier may contain the name associated with the source node and/or a serial number of the transfer. The details of the files may be expressed as parameters that define the type of file that the source node wishes to transmit, such as a list of the filenames, the date of creation of the file and/or the size of the files, for example. If the remote node computer successfully receives the message and may receive the transmitted file(s), it sends an acknowledge message 612 to the source node computer.

If the source node fails to receive an acknowledge message before the timer expires, the source node repeats the request message 610 and restarts the timer. A failure by the source node computer to acknowledge the request for a predetermined number of attempts generates an alarm message. A timer may be similarly utilized with any request message made at the source node to ensure that the remote node computer is ready to receive messages or files transferred from the source node. When the acknowledge message 612 is received, the source node computer generates and sends a message 614 to the remote node computer requesting that the remote computer create and open a new file using the filename of the file, but adding a ".tmp" extension to the filename, for example "filename1.tmp," for a transferred file named "filename1." If the remote node has successfully created and opened the file filename1.tmp, it responds by sending an acknowledgment message 616 to the source node.

The source node then sends a request 618 to write filename1.tmp to the receiving directory of the remote node. If the request 618 is successfully received, the remote node responds by sending a write acknowledge message 620 to the source node. After the write acknowledge message 620 is received at the source node, the source node computer then proceeds to push the file (i.e., filename1.tmp) to the remote node computer in a data copy request message 622. The file may be copied to the remote node using a lower level file transfer protocol, for example, FTP or FTAM.

The data copy request message 622 may include an integrity check, such as an error check of the received data. For example, cyclical redundancy check (CRC) bits may be included in the header of the data copy request message 622 to check the integrity of the transferred file. The remote node computer recognizes the end of file condition of the transmitted file checks whether the CRC matches the running CRC total that is being kept on the file. If the CRC check is successful, the remote node responds by sending a data copy acknowledgment message 624 to the source node computer. It is to be understood an integrity check scheme other than CRC known to those skilled in the art may be used in the present embodiment to detect unsuccessful data transfers. If an integrity check fails, the remote node computer may request a retransmission of the file from the source node computer for a predetermined amount of time, after which the file is deleted from the local node.

After the source node receives the acknowledgment from the remote node that the file has been successfully copied, the file filename1.tmp in the Send directory of the source node is moved to the Delete directory, as shown in FIG. 5e. Once the file is moved to the Delete directory, the output protocol directs the source computer to send a message 626 to the remote node computer requesting an "end file transfer-remove '.tmp' extension" (of the transferred file filename). The remote node computer responds by sending an acknowledge message 628 to the source node computer if the previous message 626 was successful (i.e., that the file was copied error free and the ".tmp" extension was removed at the remote node). At this point, control of the file transferred from the source node computer has shifted to the remote node computer. If more files remain in the Send directory, the sequence of processes shown in FIG. 6 is repeated for each file (one at a time). The order of selection by the output protocol of files for transfer from the Send directory is preferably the order that the files were created in the TmpReady directory (at least in the initiating mode).

The handshake operation performed by the above-described protocol exactly specifies when a file is under control of the source node and when it is under the control of the remote node. This added handshake during a file transfer between the source node and the remote node(s) prevents loss or duplication of data, which might otherwise arise from race conditions present when a file remains in an outbound directory and exclusive control of the file is not specified. Loss or duplication of files is also prevented in instances where disconnect problems occur at either the source node or the remote node (e.g., a broken communication link or during a system crash/restart) because control of the file is not shifted until the remote node acknowledges safe transfer of the file, i.e., the file will remain available for retransmission in the outbound directory (e.g., the Send directory) until receipt of a successful transfer acknowledgment from the remote node. The file transfer manager of the present embodiment also allows the remote node to retrieve files for a predetermined time from the source node in cases where the file has been safely transferred by the source node, but is thereafter corrupted at the remote node (e.g., during storage of the transferred file on disk). In such a case, the remote node may send a message to the source (local) node requesting retransmission of a file that the source node previously relinquished control thereof. Because the file is maintained in the Delete or Keep directories for a configurable amount of time, the file manager may efficiently scan these directories for the requested file and move the file from the Delete or Keep directories to the Send directory for retransmission.

Multiple remote nodes (destinations) may be supported by, the present embodiment, but the file(s) will only be sent to exactly one destination at a time. A file(s) or message(s) transferred to multiple destinations may be made by utilizing any file transfer protocol available in the network interface layers, preferably by way of an industry-standard protocol, such as FTAM, FTP, or the remote procedure call (RPC, for sending short data messages), and data transmission protocols such as TCP/IP or OSI-WAN, for example.

The present invention is particularly suitable for transferring a series of data files from a Computer which produces such files in very large numbers, such as a Formatting and Output Subsystem (FOS), which is a post-processing system that formats data so that it can easily be handled by other post-processing systems, such as a billing center, for example. An FOS may collect raw charging data from a telephony switch, store the data, and then extract call records from the message store and decode/encode them. Depending on the input values, data types are selected, formatted, and multicast to post-processing systems, such as a network mediator, a billing system, or other business support systems.

Figure 7:
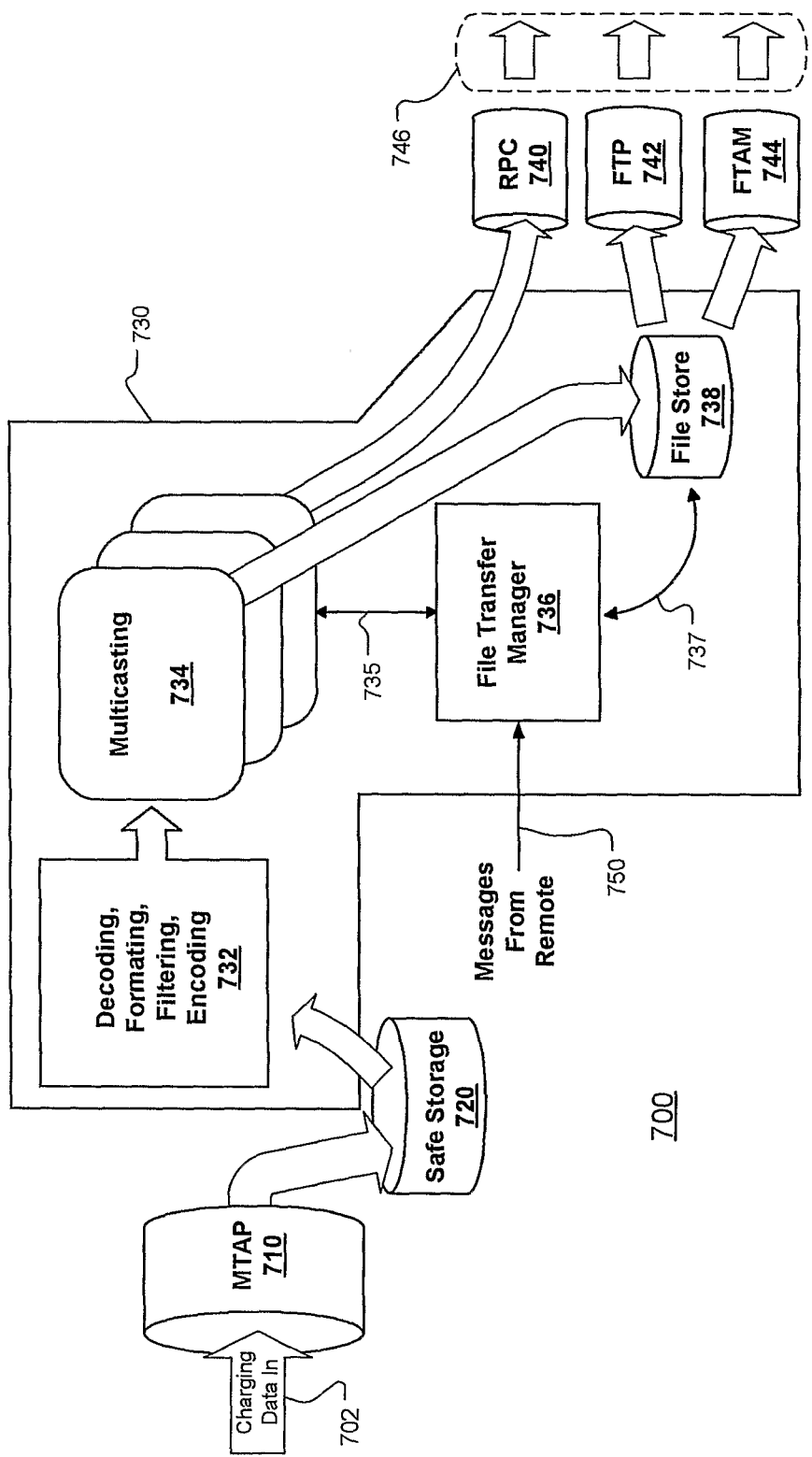
FIG. 7 is a block diagram of an exemplary formatting and output subsystem (FOS) utilizing a output protocol in accordance with a second embodiment of the present invention.

FIG. 7 is a diagram showing the data flow in an exemplary computer system 700 that processes raw charging data comprising an FOS utilizing an output protocol in accordance with a second embodiment of the present invention. In computer system 700, raw charging data 702 is received by the FOS 730 via a high-capacity message transfer protocol AP (MTAP) and is safely stored in safe storage device 720. FOS 730 then may be activated to process and send formatted charging data by an internal calendar mechanism (not shown) at predefined intervals, by a post-processing system, a user via a Telnet connection, or other initiating procedure. When activated, the raw charging data flows from the safe storage device 720 to the decoding, formatting, filtering and encoding device 732 in which call records are extracted and formatted from the raw charging data. Device 732 also includes a multicasting component 734 for preparing formatted charging data files for multicasting, one file at a time, to several destination (remote) nodes. While device 732 is shown as a single block and is described as a device, it is essentially a data processing application, or supportive of an application of the FOS for providing formatted data files for transfer to one or more remote node devices. The functionality of device 732 may be divided between several software and/or hardware subcomponents. Communication line 735 represents a communication path between device 732 and component 734 and a file transfer manager 736, a device for providing output protocol of the present invention. For example, the output protocol device may be the file transfer manager 430 of the first exemplary embodiment. File transfer manager 736 has access along path 737 to a file store 738 in which the multicast data files from multicasting component 734 are stored. File transfer manager 736 has several associated directories in file store 738 and moves files the FOS wishes to transfer according to the processes described above with respect to FIGS. 5b-5g. Files destined for transfer that are output from multicasting component 734 may be created directly in an initial directory of the file transfer manager 736, for example, the directory TmpReady shown in FIG. 5a. Alternatively, file transfer manager 736 may be configured to be instructed to move one or more files into the file transfer manager initial directory as needed by the formatting application device 732 and multicasting component 734. Files transferred out of the file store 738 by the file transfer manager 736 may utilize either FTP 742, FTAM 744 or other file transfer protocols in the lower protocol layer for copying the files to a remote node, the choice depending on the appropriate protocol needed to transfer a file to the remote node. Also shown output from multicasting component 734 is a path to the message-based remote procedure call protocol (RPC). RPC is used in some situations where, instead of collecting several messages in a file, an urgent, short data message must be sent to a post-processing system. For example, hot billing may be implemented by using RPC to output call records with minimal delay (e.g., less than 10 seconds) through computer system 700. After communicating with the lower protocol layers, the formatted charging data 746 is transferred to a single, or multiple destinations.

Figure 8:
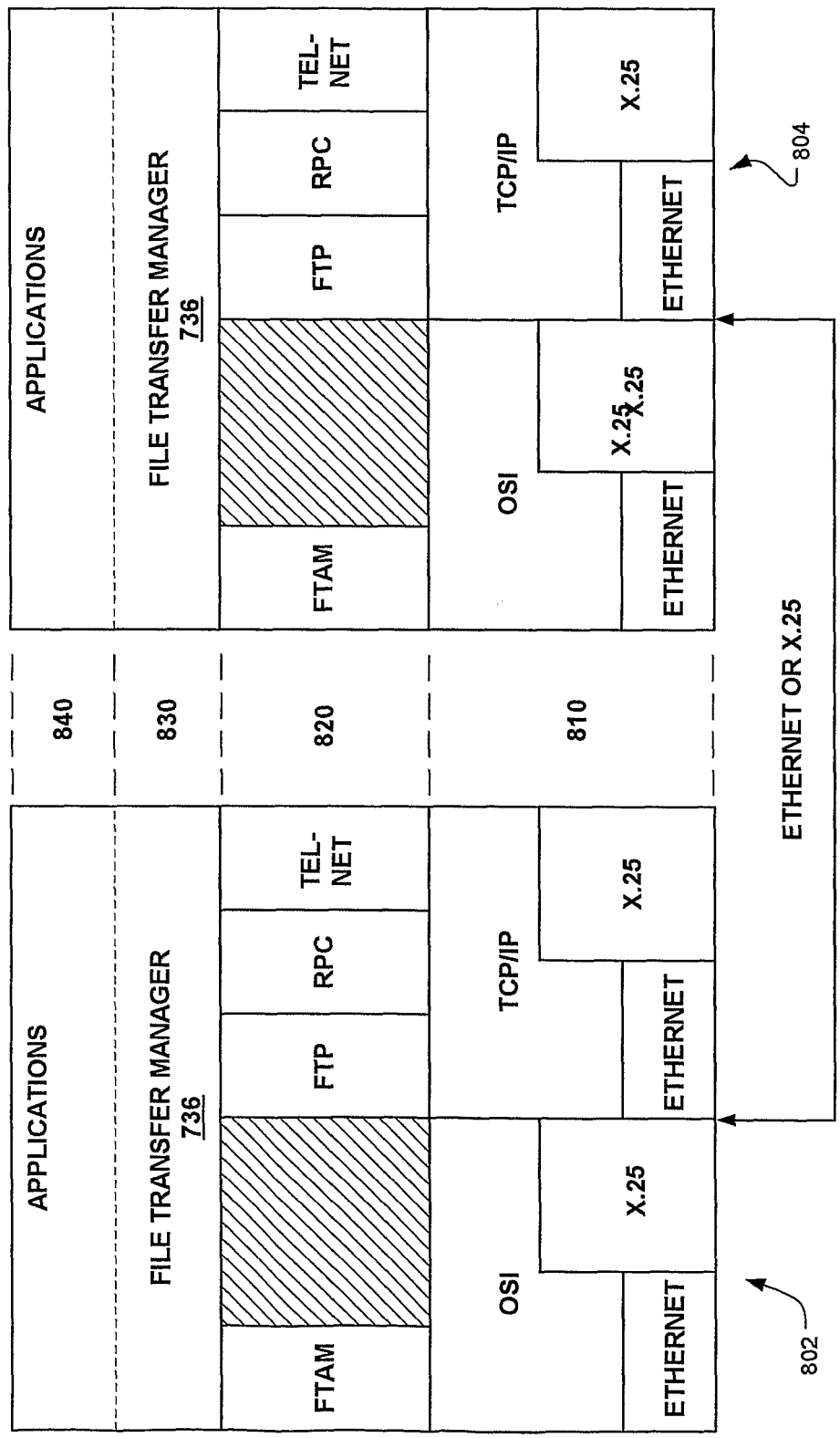
FIG. 8 shows an exemplary protocol stack of a source node computer that may be used in the system of FIG. 7.

FIG. 8 shows an exemplary layered communication protocol stack 810-840 that may be used in the computer system 700 to establish a connection and safely transfer files and/or messages between the source node computer and a remote node computer. The source node computer utilizes the protocol architecture 802 and the remote node computer utilizes the protocol architecture 804, however, the designations source and remote for architectures 802, 804 may be interchanged depending on whether a node is initiating the file transfer or is on the receiving end the file transfer. It is to be understood that the layered communication protocol shown in FIG. 8 is for purposes of conceptual understanding of the invention, and is not intended to show every possible combination of protocols. It will be apparent to those skilled in the art that other protocol combinations may be used when practicing the invention.

Layers 810-820 comprise the network interface layers of the communication protocol stacks of architectures 802, 804, such as the network interface layers 320 described above. Starting with layer 810, it is shown that the source node computer 802 may use a combination including OSI-WAN and Ethernet or X.25 network protocol, or a combination including TCP/IP and Ethernet or X.25 protocol. FTAM, FTP, RPC and TELNET protocols of the layer 820 are shown above corresponding data transfer protocols of layer 810 to conceptually illustrate communication between appropriate combinations of message and file transfer protocols and lower level protocols OSI and TCP/IP of layer 810. Protocol layer 830 is a higher level layer that includes a file transfer manager 736 utilizing safe output protocol, as described above, for transferring files to one or more destinations. Above layer 830 is the application layer 840 that includes the software application(s) running on the computer. An application in the application layer at the source node may communicate with the file transfer manager 736 when it desires to send one or more files to one or more remote node computers.

The lower protocol stack layers 810-820 comprise an industry-standard processor platform base that offers wide support for commercially available computer hardware and software. By using an industry-standard platform in the present embodiment, benefits gained include steady increases in processing power, reductions in the physical size of computer equipment, and favorable cost trends. In addition, new features may be introduced with shorter lead time shortly after they become available in the computer industry marketplace. Another benefit of using an industry-standard platform is that network engineers gain a standardized external data interface. For example, data from a network node is generally transferred to business data systems in a billing center or in an operation and maintenance (O&M) center by means of a wide area network (WAN) or by some other long-distance data communication system. A standardized interface in these mixed environments is a welcome feature.

While protocol architectures 802 and 804 are shown in FIG. 8 as having the same protocol layers, the remote node computer may need not include every protocol combination. Although not shown, protocol architectures 802 or 804 may include additional or alternative sets of protocol combinations, for example, data-link protocols such as Token Ring, ATM, SONET and Frame Relay; session protocols such as simple network management protocol (SNMP) and control message Internet protocol (CMIP), user datagram protocol (UDP) as a transport protocol; and other industry-standard protocols. While the remote node computer protocol stack 804 is shown as including a file transfer manager 736, it does not necessarily comprise a file transfer manager.

The file transfer protocol described in the foregoing exemplary embodiments may be used for safely transferring charging information to a billing system or mediator, and also for any other type of data that has to be safely transferred.

The various aspects of the invention have been described in connection with a number of exemplary embodiments. To facilitate an understanding of the invention, many aspects of the invention were described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

It will be apparent to those skilled in the art that various changes and modifications can be made in safe output protocol for files to multiple destinations with integrity check of the present invention without departing from the spirit and scope thereof. Thus, it is intended that the present invention cover the modifications of this invention provided they come within the scope of the appended claims and their equivalents.

What is claimed is:

1. In a network, an apparatus for transferring one or more electronic files between a first system at a first location and one or more receiving systems remote from the first system, the apparatus comprising:
   a safe storage device for receiving and storing raw charging data;
   a Formatting and Output Subsystem (FOS) comprising:
      a microprocessor with an associated memory for storing instructions that, when executed by the microprocessor, cause the apparatus to:
         receive the raw charging data from the safe storage device at predefined intervals;
         extract and format call records from the raw charging data; and
         prepare formatted charging data files for multicasting via a multicasting device; and
   a file transfer manager for sending the formatted charging data files to a multicast data file store, wherein the formatted charging data files are sent to the one or more receiving systems.

2. The apparatus of claim 1, wherein the raw charging data is for use in a billing center.

* * * * *

UNITED STATES PATENT AND TRADEMARK OFFICE
CERTIFICATE OF CORRECTION

PATENT NO.         : 8,489,706 B2
APPLICATION NO.    : 13/345350
DATED              : July 16, 2013
INVENTOR(S)        : Schilders It is certified that error appears in the above-identified patent and that said Letters Patent is hereby corrected as shown below:

On the Title Page, in column 1, under "Related U.S. Application Data",
delete "(63) Continuation.......Pat. No. 8,117,274." and insert -- (63) Continuation of application No. 10/481,542, filed on Jul. 2, 2004, now Pat. No. 8,117,274, filed as National Stage Entry of application No. PCT/SE02/00733, filed on Apr. 11, 2002.
(60) Provisional application No. 60/299,475, filed on Jun. 21, 2001. --, therefor.

In the Drawings:

In Fig. 8, Sheet 6 of 6, delete " X.25 X.25 " and insert -- X.25 --, therefor.

In the Specification:

In Column 1, Lines 7-11, delete "This....................reference." and insert -- This application is a continuation of co-pending U.S. patent application Ser. No. 10/481,542, filed on Jul. 2, 2004, which claims benefit of from U.S. Provisional Application No. 60/299,475, filed on Jun. 21, 2001 and is also a National Stage entry of application No. PCT/SE02/00733, filed on Apr. 11, 2002, the disclosures of which are fully incorporated herein by reference. --, therefor.

In Column 3, Line 22, delete "a output" and insert -- an output --, therefor.

In Column 9, Line 3, delete "by," and insert -- by --, therefor.

In Column 9, Line 13, delete "Computer" and insert -- computer --, therefor.

In Column 10, Line 33, delete "layers 320" and insert -- layers 330 --, therefor.

In Column 10, Line 35, delete "computer 802" and insert -- computer 100 --, therefor.

Signed and Sealed this
Twentieth Day of May, 2014

Michelle K. Lee
*Deputy Director of the United States Patent and Trademark Office*